(12) United States Patent
McCalley et al.

(10) Patent No.: US 10,209,804 B2
(45) Date of Patent: Feb. 19, 2019

(54) EMISSIVE DISPLAY OVER RESISTIVE TOUCH SENSOR WITH FORCE SENSING

(71) Applicant: Rockwell Collins, Inc., Cedar Rapids, IA (US)

(72) Inventors: Cameron T. McCalley, Marion, IA (US); James D. Sampica, Anamosa, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 16 days.

(21) Appl. No.: 15/402,614

(22) Filed: Jan. 10, 2017

(65) Prior Publication Data

US 2018/0196568 A1    Jul. 12, 2018

(51) Int. Cl.

| | |
|---|---|
| *G06F 3/041* | (2006.01) |
| *G06F 3/042* | (2006.01) |
| *G06F 3/045* | (2006.01) |
| *B64D 43/00* | (2006.01) |
| *G06F 3/044* | (2006.01) |

(52) U.S. Cl.
CPC ........... *G06F 3/0414* (2013.01); *B64D 43/00* (2013.01); *G06F 3/044* (2013.01); *G06F 3/045* (2013.01); *G06F 3/0421* (2013.01); *G06F 2203/04109* (2013.01)

(58) Field of Classification Search
CPC combination set(s) only.
See application file for complete search history.

(56) References Cited

U.S. PATENT DOCUMENTS

| | | | |
|---|---|---|---|
| 6,437,921 B1 | 8/2002 | Whitehead | |
| 6,492,979 B1* | 12/2002 | Kent | G06F 3/0414 178/18.01 |
| 6,865,011 B2 | 3/2005 | Whitehead et al. | |
| 8,144,271 B2 | 3/2012 | Han | |
| 8,259,240 B2 | 9/2012 | Han | |
| 2012/0212445 A1* | 8/2012 | Heikkinen | G06F 1/1626 345/174 |
| 2013/0188254 A1 | 7/2013 | Li et al. | |
| 2014/0092052 A1* | 4/2014 | Grunthaner | G06F 3/044 345/174 |
| 2014/0139450 A1* | 5/2014 | Levesque | G08B 6/00 345/173 |
| 2014/0237408 A1 | 8/2014 | Ohlsson et al. | |
| 2014/0375601 A1 | 12/2014 | Liu et al. | |

(Continued)

*Primary Examiner* — Lixi C Simpson
(74) *Attorney, Agent, or Firm* — Angel N. Gerdzhikov; Donna P. Suchy; Daniel M. Barbieri

(57) ABSTRACT

A system and related method for force-sensitive emissive display incorporates a force sensing device, such as a force-sensitive resistor or frustrated total internal reflection (FTIR) assembly, bonded to a flexible film/film resistive touch sensor and an emissive display surface. The film/film resistive touch sensor may detect contact with the display surface and transmit the detected contact to the force sensing device, which determines a magnitude or degree of touch force associated with the detected contact. A display controller of the force-sensitive emissive display system may adjust the displayed content, or execute other responsive actions, based on the detected touch force as well as the position of the contact relative to the display surface, as determined by the film/film resistive touch sensor or by the force sensing device.

20 Claims, 5 Drawing Sheets

(56) References Cited

U.S. PATENT DOCUMENTS

2016/0103544 A1* 4/2016 Filiz .................. G06F 3/0414
                                                      345/174
2017/0228075 A1* 8/2017 Lin .................... G06F 3/0412

* cited by examiner

EMISSIVE DISPLAY OVER RESISTIVE TOUCH SENSOR WITH FORCE SENSING

BACKGROUND

Force-sensitive touch interaction can bring additional intuitive functionality to touchscreen avionics. By adding a force-sensitive component to the touch-sensitive input (e.g., detecting a degree, or a magnitude, of force, rather than the binary presence or absence of force), the touchscreen functionality of an avionics display may include basic tasks such as speeding or slowing scroll bars or dials based on input force, alternating menus depending on the force level applied, or other human-machine interface (HMI) software efficiencies. A major challenge in enabling force-sensitive touch input—especially so in an avionics context—is incorporating force-sensing functionality without either a) increasing mechanical complexity, e.g., by adding strain gauges, or b) placing force-sensing hardware within a display bezel of limited size, without interfering with the active display area. For example, if the display is a liquid crystal display (LCD) assembly, placing force sensors directly behind the display may be difficult due to the thickness of the cover glass, as well as the necessity of a backlight module incorporated within the LCD. Further, LCD assemblies are sensitive to force applied directly to the LCD cells, as the force creates a cell gap distortion which causes the display to flash for short impacts. Worse, sufficient localized force may permanently blotch, or distort, a portion of the display surface.

SUMMARY

Embodiments of the inventive concepts disclosed herein are directed to a system and related method for providing force-sensitive input via an emissive avionics display unit. Emissive displays, wherein the display surface comprises an array of individual emissive devices, provide a solid-state alternative to LCD assemblies in that emissive displays are not subject to the fluid cell gap issues associated with LCDs, nor are emissive displays as sensitive to forces applied directly to the display surface. In addition, emissive displays are potentially much thinner than their LCD-based counterparts. By incorporating film/film type sensors coupled with a force-sensitive resistor or similar sensor, avionics displays can take advantage of the dimensional aspects of emissive display assemblies (thin, compact, light; freeform/nonplanar implementations) while incorporating force-sensitive input without significantly increasing system complexity, and allowing the sensor to be placed behind the display.

In one aspect, embodiments of the inventive concepts disclosed herein are directed to a force-sensitive emissive display device. The device may include, underneath an outer layer of protective cover glass an emissive layer configured to display images via an array of emissive devices. The emissive display device may detect the touch force of a contact with the device (e.g., by a finger or stylus) and position data of the contact via a resistive sensor layer (e.g., a film/film touch sensor) bonded to the rear of the touchscreen and comprising resistive layers carried by flexible substrates. The device may include a force sensing device positioned behind the touch sensor for generating force data based on the detected touch force. The device may include a display controller for generating the images displayed by the emissive devices and configured to receive the force and position data, adjusting the displayed images in response to the force or position of the contact. The device may include drive electronics for displaying the generated images via the emissive devices.

In a further aspect, embodiments of the inventive concepts disclosed herein are directed to an avionics display system installable in an aircraft and including one or more force-sensitive emissive display devices. The device may include, underneath an outer layer of protective cover glass an emissive layer configured to display images via an array of emissive devices. The emissive display device may detect the touch force of a contact with the device and position data of the contact via a resistive sensor layer bonded to the rear of the touchscreen and comprising resistive layers carried by flexible substrates. The device may include a force sensing device positioned behind the touch sensor for generating force data based on the detected touch force. The device may include a display controller for generating the images displayed by the emissive devices and configured to receive the force and position data, adjusting the displayed images in response to the force or position of the contact. The device may include drive electronics for displaying the generated images via the emissive devices.

In a still further aspect, embodiments of the inventive concepts disclosed herein are directed to a method for force-sensitive emissive display. The method may include detecting a contact with an emissive display device and generating location data of the contact via a resistive sensor layer of the device. The method may include transmitting the location data to a display controller of the emissive display device. The method may include generating force data of the contact via a force sensing device, such as a force-sensitive resistor or frustrated total internal reflection (FTIR) assembly bonded to the resistive sensor layer. The method may include transmitting the force data to the display controller via the force sensing device and executing, via the display controller, actions responsive to the received force data and position data.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION OF EXEMPLARY EMBODIMENTS

Figure 1:
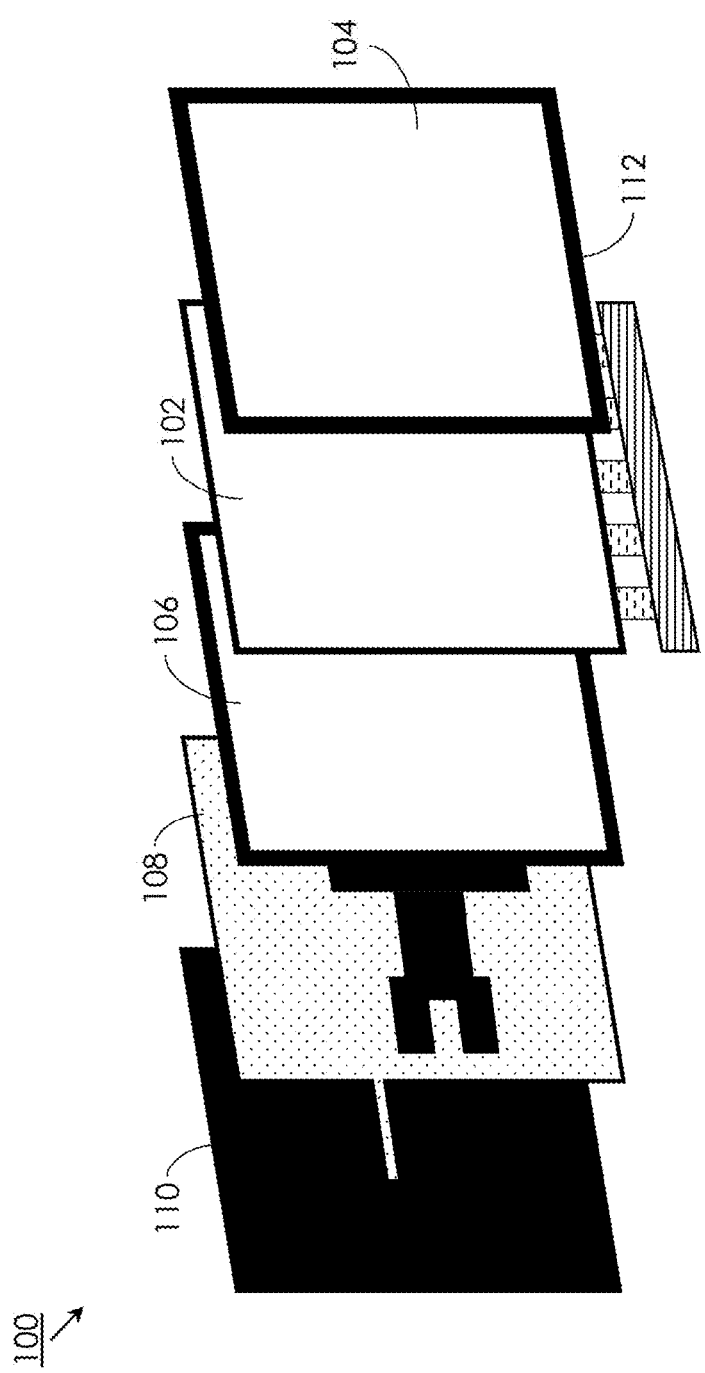
FIG. 1 illustrates an exemplary embodiment of a force-sensitive emissive display device according to the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a' and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to a system and related method for a force-sensitive emissive display system. Emissive display systems provide a solid-state, thinner alternative to LCDs or displays equipped with bezel-mounted strain-gauges or other rigid touch sensors; while these display systems may provide force sensing functionality, their complexity and bulk may restrict their use in a compact avionics environment.

Referring to FIG. 1, an exemplary embodiment of a force-sensitive emissive display system 100 according to the inventive concepts disclosed herein may include an emissive display layer 102 covered by an ultrathin layer of cover glass 104, a film/film resistive touch sensor 106 bonded to the emissive display layer 102, and one or more force sensing devices 108 bonded to the film/film resistive touch sensor 106 and emissive display layer 102. The force-sensitive emissive display system 100 may include an assembly backer layer 110, via which the force-sensitive emissive display system 100 may be mounted in an aircraft cockpit as a component of a larger multi-unit avionics display system. The force-sensitive emissive display system 100 may be enclosed in a bezel 112 defining a displayable area. For example, the emissive display layer 102 may comprise an array of emissive devices (e.g., light emitting diodes (LED) or organic LEDs (OLED)) connected to drive electronics (114) configured to display, via the emissive devices, one or more images visible to the pilot or crew through the transparent cover glass 104. The emissive display layer 102 may be divided into sub-regions, each subregion dedicated to a particular display controlled by the drive electronics 114 (e.g., maps, gauges, synthetic or enhanced vision). The pilot may change the operation of the force-sensitive emissive display system 100 by making contact with the emissive display layer 102 through the cover glass 104, with, e.g., one or more fingers or a stylus. For example, the pilot may cause the force-sensitive emissive display system 100 to cease displaying the currently displayed image and display one or more alternate images; the pilot may cause the force-sensitive emissive display system 100 to superimpose a menu or alternate image over the currently displayed image; or the pilot may cause the force-sensitive emissive display system 100 to shift the position of a currently displayed image, gauge, or map from a first region or location of the emissive display layer 102 to a second region or location. The pilot may also interact with other avionics systems via contact with the force-sensitive emissive display system 100.

Figure 2:
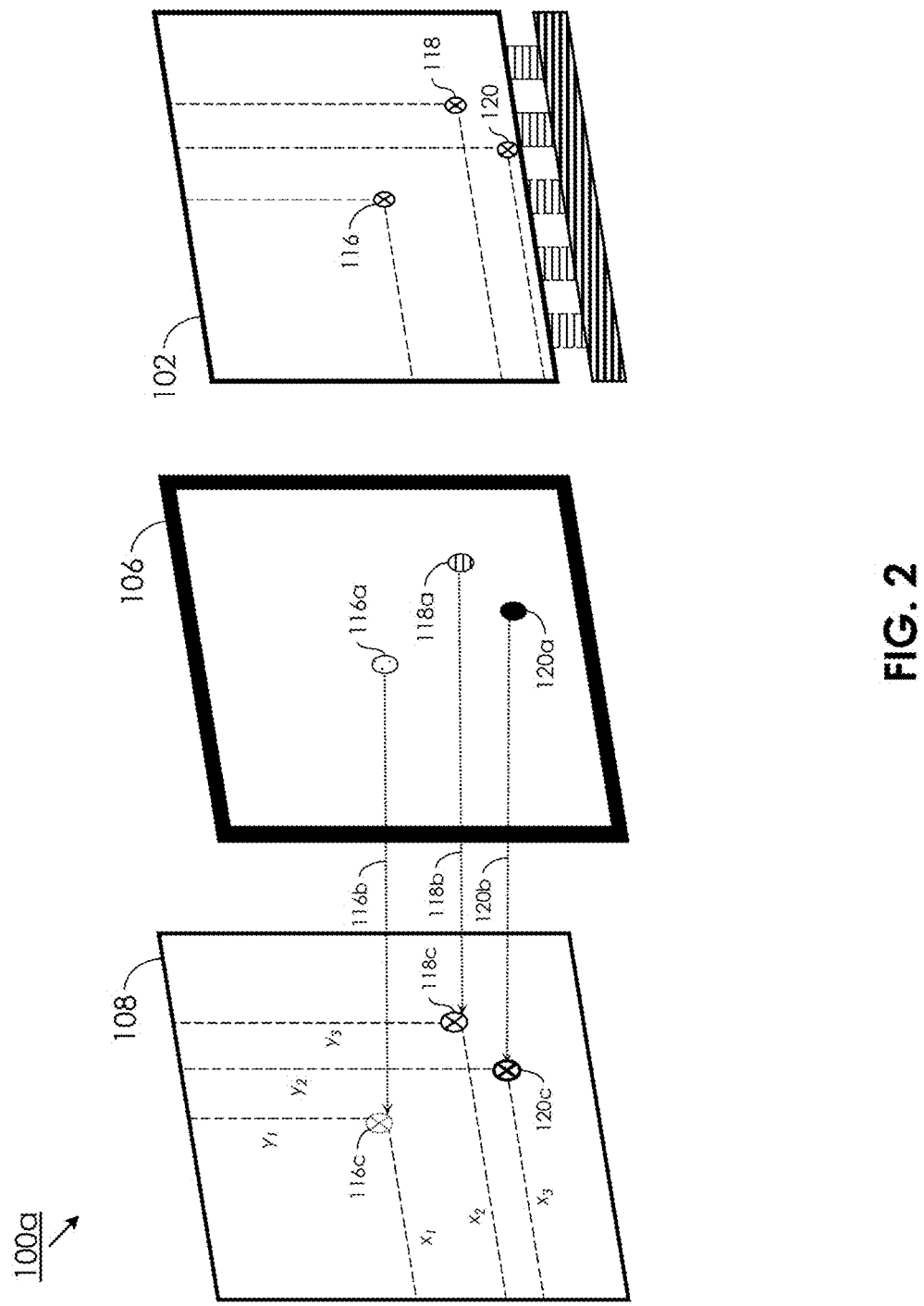
FIG. 2 illustrates operations of the force-sensitive emissive display device of FIG. 1.

Referring to FIG. 2, the force-sensitive emissive display system 100a may be implemented and may operate similarly to the force-sensitive emissive display system 100 of FIG. 1, except that the force-sensitive emissive display system 100a may generate touch force data and position data based on detected contact by the pilot with the emissive display layer 102, through the cover glass (104, FIG. 1). For example, the pilot may make contact with the emissive display layer 102 at three points: at point 116, using a minimal amount of force; at point 118, using a moderate amount of force, and at point 120, using a high amount of force. The emissive display layer 102 and film/film resistive touch sensor 106 may collectively function as a "touchscreen" by which the touch force associated with each point of contact (116, 118, 120) is detected (116a, 118a, 120a) by the film/film resistive touch sensor 106 and the detected touch force transmitted (116b, 118b, 120b) to the force sensing device 108. The force sensing device 108 may generate touch force data based on the detected contacts, e.g., a minimal degree of touch force associated with point 116, a moderate degree of touch force associated with point 118, and a high degree of touch force associated with point 120. The force sensing device 108 may include one or more force-sensitive resistors positioned directly behind the film/film resistive touch sensor 106 and coupled to a display controller (see FIG. 3) or avionics processor for adjusting the content displayed via the emissive display layer 102 based on the magnitude or degree of the detected touch force. The force sensing device 108 may include a frustrated total internal reflection (FTIR) assembly, which measures force based on the degree by which said force (e.g., contact with the emissive display layer 102 as indicated by points 116, 118, 120) interacts with one or more internally reflective layers into which light is injected. The internally reflective layers may include any combination of rigid and flexible materials; light may be injected thereinto via an array of LEDs or similar compact light sources mounted at the edges of the emissive display system 100a, e.g., within the enclosing bezel 112, along with properly located optical sensors for detecting the degree of frustration.

Content may also be adjusted based on the position or location of the detected touch force in addition to the magnitude or degree of the touch force. The film/film resistive touch sensor 106 may include position sensors for determining a position for each point of contact (116, 118, 120). (In some embodiments, the emissive display layer 102 may include a capacitive touchscreen configured to detect the touch and position data of the touch, transmitting the position data to the display controller and the touch to the force sensing device 108.) The determined position data may correspond to a region, sub-region, or area of the emissive display layer 102, or to a more particular point or set of points. For example, a rectangular display area of the emissive display layer 102 may correspond to an x-dimension (e.g., width) and a y-dimension (e.g., height). The position sensors of the emissive display layer 102 may detect a coordinate set $(x_1, y_1)$ corresponding to the point of contact 116, a coordinate set $(x_2, y_2)$ corresponding to the point of contact 118, and a coordinate set $(x_3, y_3)$ corresponding to the point of contact 120. The force sensing device 108 may independently correlate position information to each detected touch force or point of contact (116c, 118c, 120c). In this way, the force sensing device 108 may augment the position sensors of the film/film resistive touch sensor 106 by providing redundant position data, or serve as a backup system should the primary position sensors be rendered inoperative.

Figure 3:
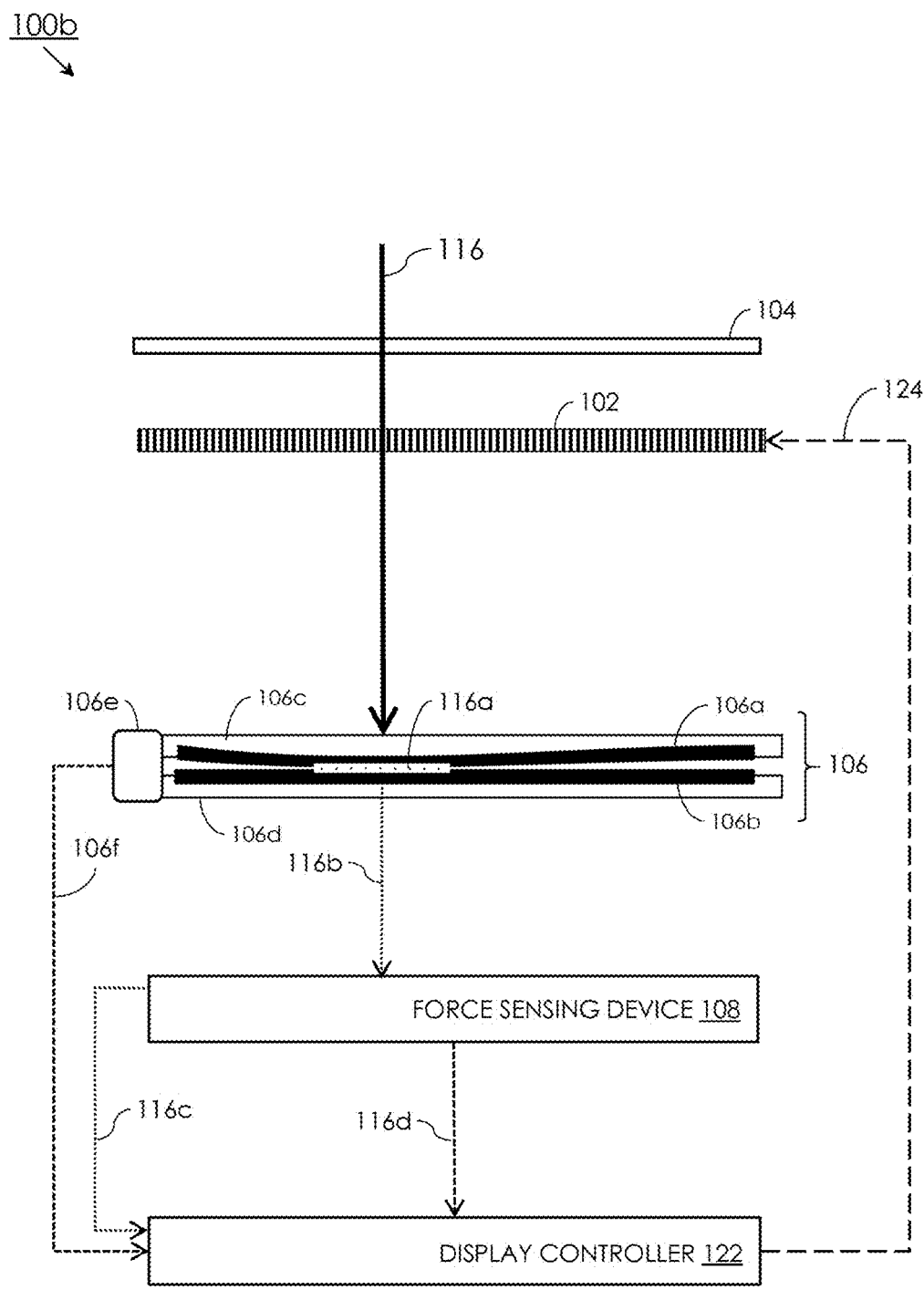
FIG. 3 is a block diagram of system components of the force-sensitive emissive display device of FIG. 1.

Referring to FIG. 3, the force-sensitive emissive display device 100b may be implemented and may function similarly to the force-sensitive emissive display device 100 of FIG. 1, except that the force-sensitive emissive display device 100b may include a display controller 122 (e.g., display processor) configured for executing responsive actions (124) triggered by detected touch forces, e.g., altering or shifting the images displayed via the emissive display layer 102 via the array of emissive devices. Contact (116) with the emissive display layer 102 (through the cover glass 104) may be detected by the film/film resistive touch sensor 106, wherein two or more electronically resistive or conductive layers 106a, 106b may each be disposed on ultrathin flexible substrates (106c, 106d) which deform in response to the contact (116), placing the electronically resistive layers (106a, 106b) into contact with each other (detected touch force 116a). The film/film resistive touch sensor 106 may include position sensors (106e) for determining position data (106f) corresponding to the detected touch force 116a and transmitting the position data to the display controller 122. The resulting detected touch force (116a) may be transmitted (116b) by the film/film resistive touch sensor 106 to the force sensing device 108 (e.g., one or more force sensitive resistors or an FTIR assembly), which determines the magnitude or degree (116d) of the detected touch force (which may include supplementary position information 116c) and transmits the determined magnitude/degree 116d to the display controller 122.

Figure 4:
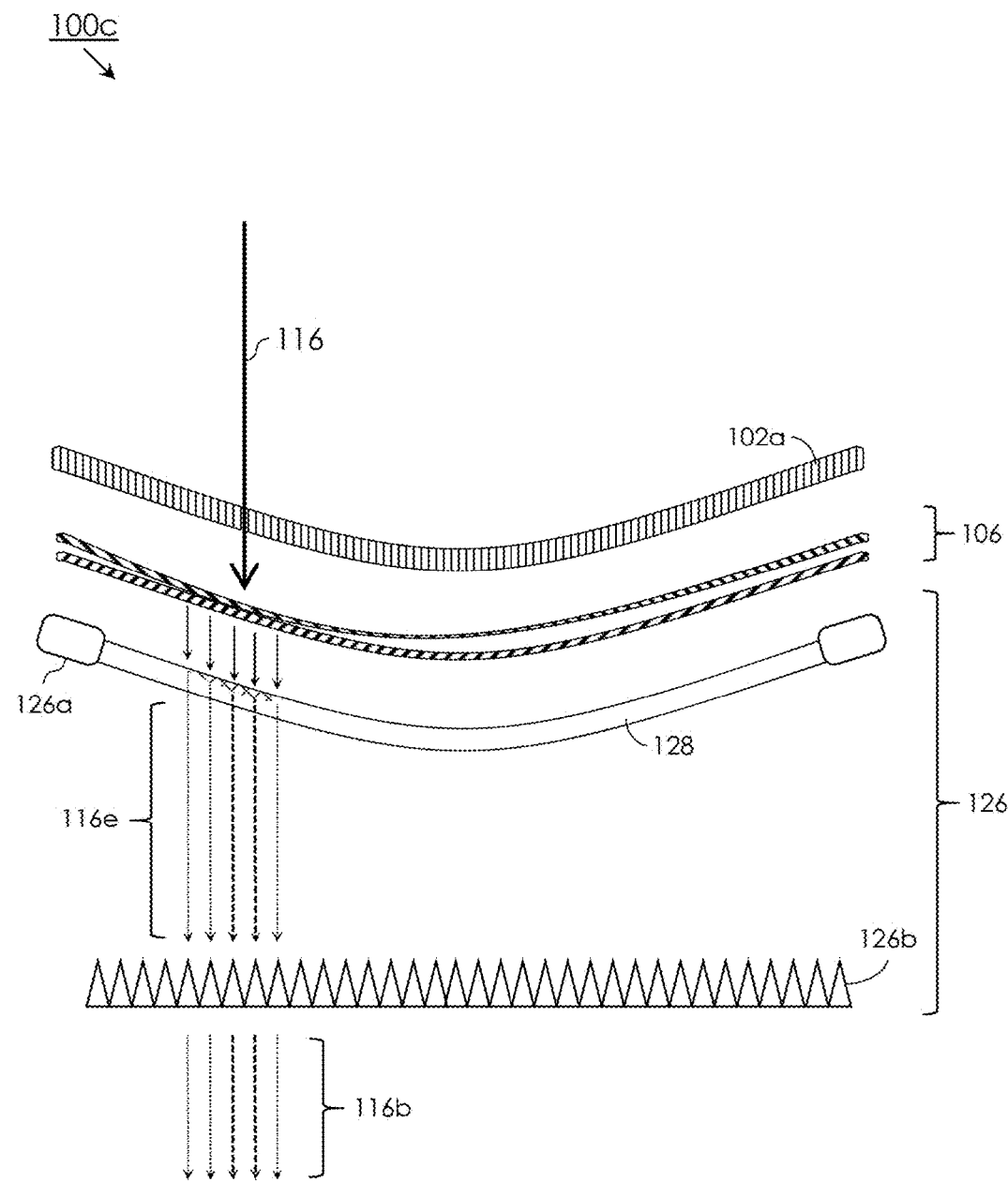
FIG. 4 illustrates an embodiment of the force-sensitive emissive display device of FIG. 1

Referring to FIG. 4, a force-sensitive emissive display device 100c may be implemented and may function similarly to the force-sensitive emissive display device 100 of FIG. 1, except that the force-sensitive emissive display device 100c may incorporate a freeform surface (e.g., convex, concave, and/or otherwise nonplanar). For example, the force-sensitive emissive display device 100c may incorporate an FTIR assembly 126 as a force sensing device (e.g., 108, FIG. 3). The FTIR assembly 126 may include an array of optical sensors positioned at the edges (126a) of the internally reflective layer/s 128 of the FTIR assembly or behind (126b) the force-sensitive emissive display device 100c (from the perspective of the viewing/operating pilot). Contact (116) with the nonplanar emissive display layer (102a) may be detected by the film/film resistive touch sensor 106 and transmitted to the FTIR assembly 126, wherein the optical sensors (126a-b) may translate the measured frustration of an internally reflective layer (116e) into a magnitude/degree of touch force (116b) transmitted to the display controller (122, FIG. 3) for further processing.

Figure 5:
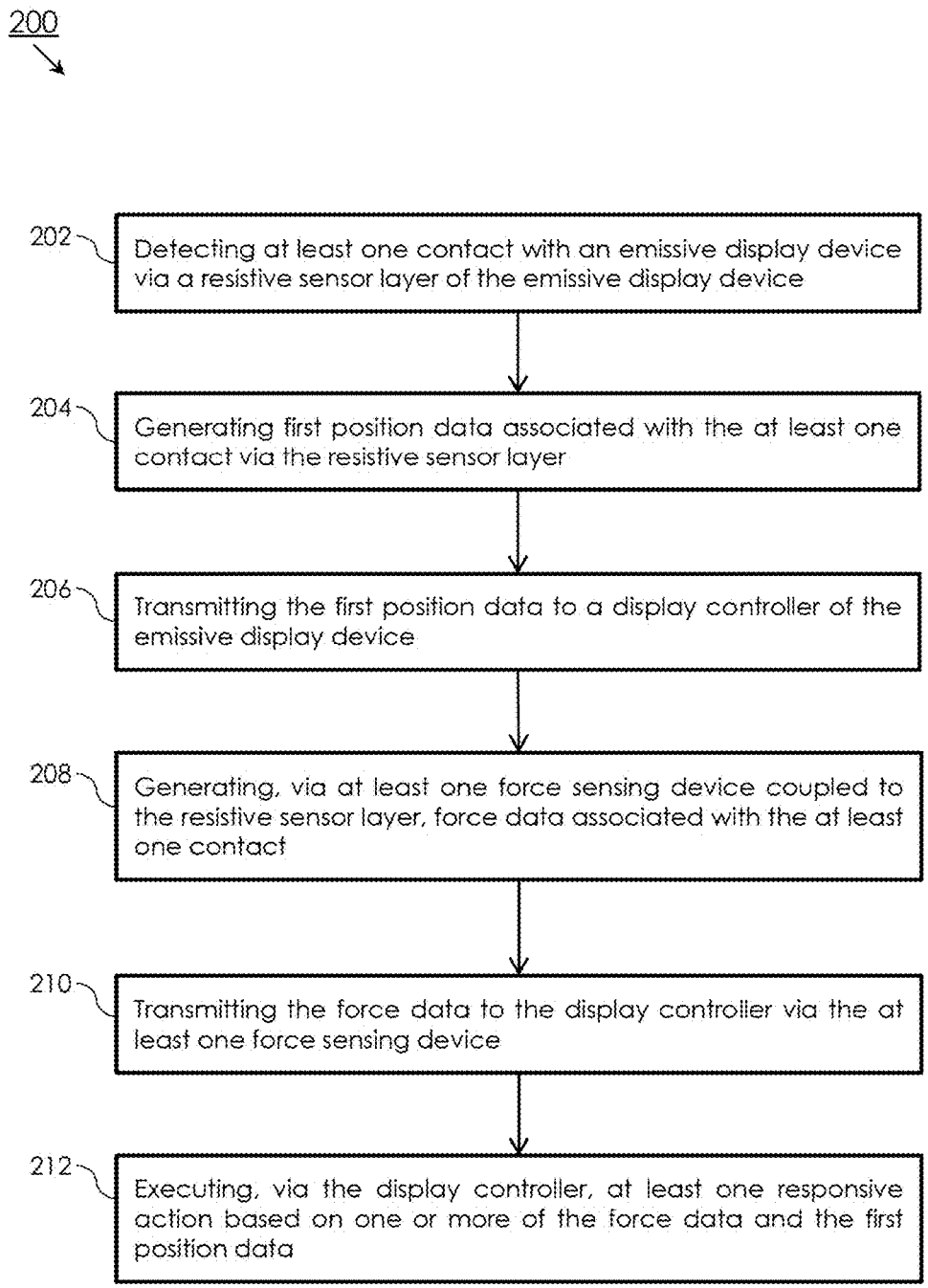
FIG. 5 illustrates an exemplary embodiment of a method for force-sensitive emissive display according to the inventive concepts disclosed herein.

Referring now to FIG. 5, an exemplary embodiment of a method 200 for force-sensitive emissive display according to the inventive concepts disclosed herein may be implemented by the force-sensitive emissive display device 100 in some embodiments, and may include one or more of the following steps.

At a step 202, the film/film resistive touch sensor of the force-sensitive emissive display device detects contact with the device (e.g., with the emissive display layer or its cover glass by a stylus or finger of the pilot).

At a step 204, position sensors of the film/film resistive touch sensor generate position data associated with the detected contact.

At a step 206, the position sensors of the film/film resistive touch sensor transmit the position data to a display controller of the force-sensitive emissive display device.

At a step 208, a force sensing device bonded to the film/film resistive touch sensor generates touch force data (e.g., the magnitude or degree of force associated with the detected contact) based on the detection of the contact by the film/film resistive touch sensor layer. The touch force data may be generated by one or more force-sensitive resistors bonded to the film/film resistive touch sensor, or by a frustrated total internal reflection (FTIR) assembly bonded to the film/film resistive touch sensor. The force sensing device may determine redundant position data associated with the detected contact.

At a step 210, the force sensing device transmits the touch force data to the display controller. The force sensing device may transmit with the touch force data any redundant position data associated with the detected contact.

At a step 212, the display controller executes one or more responsive actions based on the received touch force data and the position data. The display controller may execute responsive actions based on the position data determined by the position sensors, the redundant position data determined by the force sensing device, or both.

As will be appreciated from the above, systems and methods according to embodiments of the inventive concepts disclosed herein may incorporate thinner and less complex emissive displays, or design freeform and nonplanar emissive display surfaces, e.g., for compact or non-standard cockpit applications, while maintaining force-sensitive functionality usually associated with bulkier and more complex LCD or strain-gauge equipped display systems.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

We claim:

1. A force-sensitive emissive display device, comprising:
   at least one emissive layer comprising a front surface, a rear surface, and a plurality of emissive devices, the emissive layer configured to receive at least one contact with the front surface;
   a first sensor layer coupled to the rear surface, the first sensor layer comprising one or more resistive layers carried by a flexible substrate, the first sensor layer configured to:
      detect a touch force associated with the at least one contact; and
      generate first position data associated with the at least one contact;
   a second sensor layer coupled to the first sensor layer, the second sensor layer including at least one force sensing device configured to generate force data based on the detected touch force; and
   at least one display controller coupled to the emissive layer and the second sensor layer, the display controller including at least one processor configured to:
      generate the at least one first image;
      receive at least one of the detected touch force and the first position data from the first sensor layer;
      receive the force data from the at least one force sensing device; and
      execute at least one responsive action based on at least one of the force data and the first position data; and
   drive electronics coupled to the display controller and the emissive layer, the drive electronics configured to display at least one image on the front surface via the plurality of emissive devices.

2. The force-sensitive emissive display device of claim 1, wherein:
   the at least one force sensing device is configured to generate second position data associated with the detected touch force; and
   the at least one display controller is configured to execute the at least one responsive action based on at least one of the force data, the first position data, and the second position data.

3. The force-sensitive emissive display device of claim 1, wherein the force-sensitive emissive display device is an avionics display device embodied in an aircraft.

4. The force-sensitive emissive display device of claim 1, wherein the at least one force sensing device includes at least one of a force-sensitive resistor and a frustrated total internal reflection (FTIR) assembly.

5. The force-sensitive emissive display device of claim 4, wherein the FTIR assembly includes at least one first optical sensor disposed at an edge of the force-sensitive emissive display device.

6. The force-sensitive emissive display device of claim 4, wherein the FTIR assembly includes at least one second optical sensor disposed behind the second sensor layer.

7. The force-sensitive emissive display device of claim 1, wherein one or more of the emissive layer, the first sensor layer, and the second sensor layer comprise a non-planar surface.

8. The force-sensitive emissive display device of claim 1, wherein:
   the emissive layer includes a capacitive touchscreen configured to detect the at least one touch force and generate the first position data;
   the second sensor layer is configured to receive the detected touch force from the capacitive touchscreen; and
   the display controller is configured to receive the first position data from the capacitive touchscreen.

9. An avionics display system installable aboard an aircraft, the avionics display system comprising:
   at least one force-sensitive emissive display device, the at least one force-sensitive emissive display device including:
      at least one emissive layer comprising a front surface, a rear surface, and a plurality of emissive devices, the emissive layer configured to receive at least one contact with the front surface;
      a first sensor layer coupled to the rear surface, the sensor layer comprising one or more resistive layers carried by a flexible substrate, the first sensor layer configured to detect a touch force associated with the at least one contact and generate first position data associated with the at least one contact;
      a second sensor layer coupled to the first sensor layer, the second sensor layer including at least one force sensing device configured to generate force data based on the detected touch force;
      at least one display controller coupled to the emissive layer and the second sensor layer, the display controller including at least one processor configured to:
         generate the at least one first image;
         receive at least one of the detected touch force and the first position data from the first sensor layer;
         receive the force data from the at least one force sensing device; and
         execute at least one responsive action based on at least one of the force data and the first position data; and
      drive electronics coupled to the display controller and the emissive layer, the drive electronics configured to display at least one image on the front surface via the plurality of emissive devices.

10. The avionics display system of claim 9, wherein:
    the second sensor layer is configured to generate second position data associated with the at least one contact; and
    the at least one display controller is configured to execute the at least one responsive action based on at least one of the force data, the first position data, and the second position data.

11. The avionics display system of claim 9, wherein at least one of the emissive layer, the first sensor layer, and the second sensor layer comprises a non-planar surface.

12. The avionics display system of claim 9, wherein the at least one force sensing device includes at least one of a force-sensitive resistor and a frustrated total internal reflection (FTIR) assembly.

13. The avionics display system of claim 12, wherein the FTIR assembly includes at least one first optical sensor positioned behind the FTIR assembly.

14. The avionics display system of claim 12, wherein:
the force-sensitive emissive display device is at least partially disposed within a bezel defining at least one edge of the force-sensitive emissive display device; and
the FTIR assembly includes at least one of a light-emitting diode (LED) and a second optical sensor disposed within the bezel and proximate to the at least one edge.

15. The avionics display system of claim 9, wherein:
the emissive layer includes a capacitive touchscreen configured to detect the at least one touch force and generate the first position data;
the second sensor layer is configured to receive the detected touch force from the capacitive touchscreen; and
the display controller is configured to receive the first position data from the capacitive touchscreen.

16. A method for force-sensitive emissive display, the method comprising:
detecting at least one contact with an emissive display device via a resistive sensor layer of the emissive display device;
generating first position data associated with the at least one contact via the resistive sensor layer;
transmitting the first position data to a display controller of the emissive display device via the resistive sensor layer;
generating, via at least one force sensing device coupled to the resistive sensor layer, force data associated with the at least one contact;
transmitting the force data to the display controller via the at least one force sensing device;
executing, via the display controller, at least one responsive action based on one or more of the force data and the first position data.

17. The method of claim 16, wherein generating, via at least one force sensing device coupled to the resistive sensor layer, force data associated with the at least one contact includes:
generating, via at least one force sensing device coupled to the resistive sensor layer, second position data associated with the at least one contact.

18. The method of claim 17, wherein:
transmitting the force data to the display controller via the at least one force sensing device includes transmitting the second position data to the display controller via the at least one force sensing device; and
executing, via the display controller, at least one responsive action based on one or more of the force data and the first position data includes executing, via the display controller, at least one responsive action based on one or more of the touch force, the first position data, and the second position data.

19. The method of claim 16, wherein generating, via at least one force sensing device coupled to the resistive sensor layer, force data associated with the at least one contact includes:
generating, via at least one force-sensitive resistor coupled to the resistive sensor layer, force data associated with the at least one contact.

20. The method of claim 16, wherein generating, via at least one force sensing device coupled to the resistive sensor layer, force data associated with the at least one contact includes:
generating, via at least one frustrated total internal reflection (FTIR) assembly coupled to the resistive sensor layer, force data associated with the at least one contact.

* * * * *